April 21, 1964     M. CHURILOW     3,130,360

SELF-EXCITED SELF-REGULATED ALTERNATING CURRENT GENERATORS

Filed Sept. 10, 1962

INVENTOR
Miguel Churilow

BY Watson, Cole, Grindle and Watson

ATTORNEYS

United States Patent Office 3,130,360
Patented Apr. 21, 1964

3,130,360
SELF-EXCITED SELF-REGULATED ALTERNATING CURRENT GENERATORS
Miguel Churilow, 147 Libertad St., Buenos Aires, Argentina, assignor of twenty-five percent to Pablo Churilow and twenty-five percent to Olga Antonijeva Milutinovic, both of Buenos Aires, Argentina
Filed Sept. 10, 1962, Ser. No. 222,303
10 Claims. (Cl. 322—25)

This invention relates to synchronous alternating current generators, and more particularly it refers to self-excited self-regulated alternating current generators.

The known methods for the self-excitation of alternating current generators include, e.g., the connection of reactance coils and current transformers in the output connection of the machine. An alternating voltage is thus obtained which is rectified and the resulting direct current is used as the exciting current going through the machine's field coil.

In one of the known self-regulating systems, a reactance is used having two windings. The machine load current goes through the primary coil, thus originating a secondary voltage which adds to the exciting circuit voltage to compensate for the main voltage drop produced by an increased load on the generator.

In a second system which is known in the art, a single reactance coil is used, in combination with a current transformer having a secondary winding arranged in parallel with the reactance coil circuit. The load current transformed in the current transformer, adds to the reactance coil circuit current, and so the exciting current increases under an increased load.

One major fault of these methods has been an inherent trouble with the starting excitation. The initial exciting current is, in face, a function of the magnetic remanence and of the exciting circuit impedance. The latter impedance is at a minimum when the frequency is zero, i.e., when the machine is not running, but as soon as the machine starts running and the frequency gradually increases, the impedance also increase, which tends to prevent the necessary growth of the exciting current.

A second fault of the known systems, is due to the fact that the output voltage is a function of both the exciting current and the velocity, and moreover when the reactance predominates in the exciting circuit over the resistance, the total impedance of this circuit is a linear function of the frequency, so that the exciting current is nearly constant, and the output voltage is roughly proportional to the running velocity of the machine.

But the third and main fault of the self-excited machines as known in the art is that they are unsuitable to work in parallel with other machines of the same or a different type. This is a consequence of the self-regulation principle itself, according to which, with a resistive or inductive load, the armature reaction is negative (i.e., a demagnetization reaction), and it is compensated by the positive self-regulation reaction. When the generator load is capacitive, however, the armature reaction is positive and cannot be compensated by the self-regulating system operating in the same direction. A stable parallel operation requires that a capacitive load does not cause any reaction at all in the excitation of the machine.

The reason of the above facts will be easily understood by supposing the alternating current generator connected to a fixed voltage circuit, such as the bus bars of an electrical power station. The bus bar voltage before connecting the generator may be lower than, equal to, or higher than the generator voltage. In the first case, the compensation current is inductive as seen from the generator, and an excitation current increase is not required such current being of the appropriate value to operate in these conditions. In the second case, there is no compensation current. In the third case, the compensation current is capacitive as seen from the generator, and the self-excitation reaction should be zero or positive, more excitation being required to level the output voltage when said voltage is too low. In the known self-excited regulated alternating current generators, however, a capacitive load current promotes an exciting current reduction, so that the voltage is still further reduced until all the excitation comes from the bus bars and the generator does not send power to the bars.

In accordance with this invention, there is provided for an alternating current generator having an armature winding provided with output terminals, a first field winding having an input, first converter means having an alternating current input and a direct current output. Said first converter means output is connected to said first winding input and said first converter means input is connected into a self-excitation circuit for said alternating current generator including capacitive means. A second field winding is connected to a self-excitation device having input means connected in series with said armature winding output terminals.

It is, therefore, an object of this invention to provide an alternating current generator having improved regulation characteristics.

It is a further object of the present invention to provide a prime mover and electric generator group adapted to provide an essentially constant voltage in spite of load variations.

Another object of the invention is to provide alternating current generator in which the voltage variation with rotating speed is substantially reduced.

Another object of this invention is to provide an alternating current machine in which the output voltage is a linear function of the windings resistance changes.

Other object of this invention is to provide a self-excited self regulating alternating current generator adapted for parallel connection with other sources of alternating current.

Another object is to provide an alternating current generator having good self-regulation characteristics, even when connected to a capacitive load.

A further object of this invention is to provide an alternating current generator having a greater design flexibility.

Other objects and advantages of the invention will become apparent to those skilled in the art, from the following description taken in conjunction with the accompanying drawings illustrating a preferred embodiment of the invention, and wherein.

Figure 1:
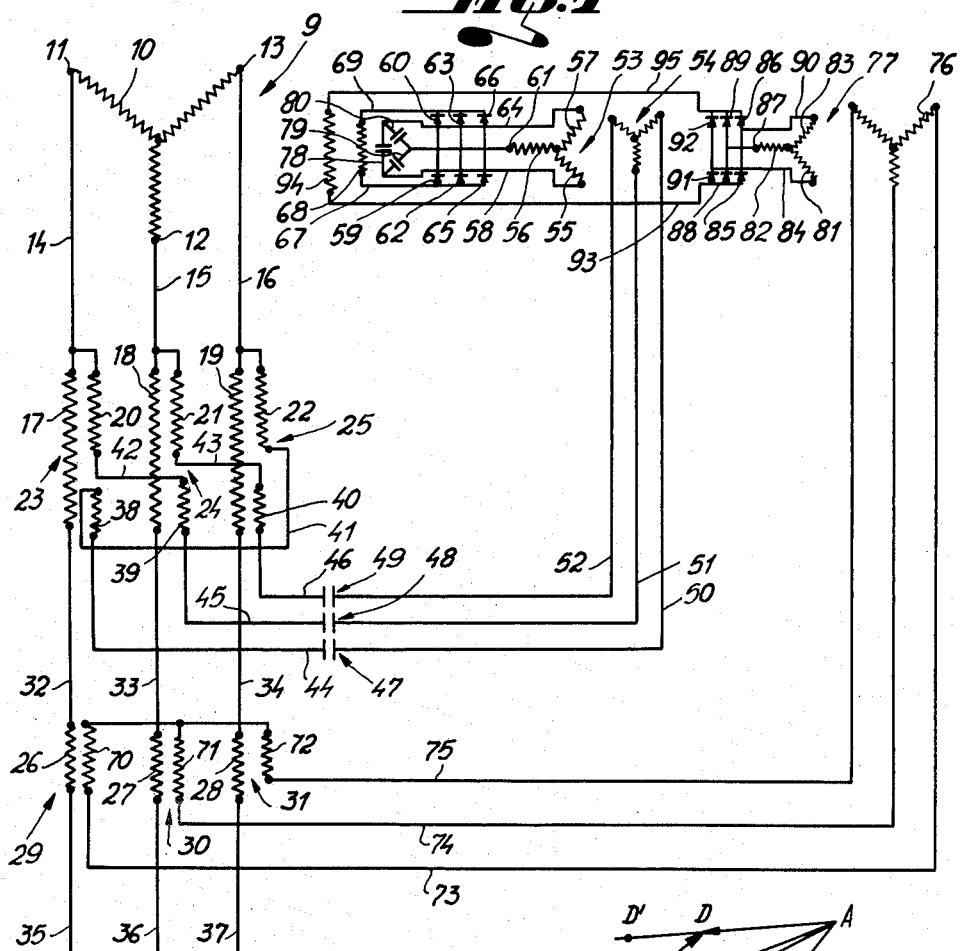
FIG. 1 is a circuit diagram of a preferred embodiment of this invention.

Now with reference to FIG. 1 of the accompanying drawings, it is shown alternating current generator 9 having an armature 10 provided with output terminals 11, 12, 13 connected via the respective leads 14, 15, 16 to the common terminals of the primary windings 17, 18, 19 and the secondary windings 20, 21, 22 of the reactors 23, 24, 25. The free terminals of primary windings 17, 18, 19 are respectively connected through leads 32, 33, 34, each to one terminal of the respective primary windings 26, 27, 28 of the current transformers 29, 30, 31 while the remaining terminals of the primary windings 26, 27, 28 are connected via the leads 35, 36, 37 to a load circuit which is not shown in the drawings.

Each one of the above mentioned reactors 23, 24, 25 is provided with a further secondary winding 38, 39, 40. The second secondary windings 38, 39, 40 of the respective transformers 23, 24, 25 are respectively series connected through leads 41, 42, 43 with the free terminals of respectively first secondary windings 22, 20, 21 of transformers 25, 23, 24, in which is a star-zigzag connection as it is well known in the art. The free terminals of the second secondary windings 38, 39, 40 are connected through leads 44, 45, 46 to one end of the respective capacitors 47, 48, 49 the other end of which is connected via the leads 50, 51, 52 to the static three-phase inductor winding 53 of a first frequency multiplier 54.

The three-phase armature of the frequency mutliplier 53 comprises three star-connected branches 55, 56, 57. Armature branch 55 is connected via the lead 58 to the junction of the semiconductor rectifiers 59, 60. The branch 56 of the frequency mutliplier armature is connected through lead 61 to the junction of the semiconductor rectifiers 62, 63. The branch 57 of the frequency multiplier armature is connected in turn via the lead 64 to the junction of the semiconductor rectifiers 65, 66. The remaining terminals of rectifiers 59, 62, 65 are connected to a conductor 67 leading to one terminal of a first field winding 68 of the alternating current generator 9. The free terminals of rectifiers 60, 63, 66 are similarly connected through a conductor 69 to the remaining terminal of the first field winding 68.

For power-factor correcting purposes, three delta-connected capacitors 78, 79, 80 are connected to conductors 58, 61, 64.

The armature of the frequency multiplier 53, including the winding branches 55, 56, 57 is mounted on the same rotating shaft as the inductor of main generator 9. In this way, the assembly of the windings 55, 56, 57, rectifiers 59, 60, 62, 63, 65, 66 and field winding 68 rotates as a whole, thus rendering the use of slip rings and similar sliding contact devices unnecessary.

Now the connections of the second field winding, which is a characteristic of this invention, will be described with reference to FIG. 1.

The secondary windings 70, 71, 72 of the above mentioned current transformers 29, 30, 31 are jointly connected at one end in a star-connection, while its free ends are connected through the wires 73, 74, 75 to the star-connected inductor winding 76 of a second frequency multiplier 77.

The three-phase armature of the frequency multiplier 77 comprises three star-connected branches 81, 82, 83. Armature branch 81 is connected via the lead 84 to the junction of the semiconductor rectifiers 85, 86. The branch 82 of the frequency multiplier armature is connected through lead 87 to the junction of the semiconductor rectifiers 88, 89. The branch 83 of the frequency multiplier armature is connected in turn via the lead 90 to the junction of the semiconductor rectifiers 91, 92. The remaining terminals of the rectifiers 85, 88, 91 are connected to a conductor 93 leading to one terminal of a second field winding 94 of the alternating current generator 9. The free terminals of rectifiers 86, 89, 92 are similarly connected through a conductor 95 to the remaining terminal of the second field winding 94.

In the operation of the alternating current generator in accordance with the present invention, at the conductors 44, 45, 46 appears, upon starting the machine, a three-phase voltage which is a composite result of the terminal voltage of the machine, and the load current, as it is usually done with compound excitation of generators. Now, the windings 20, 21, 22 and 38, 39, 40 have a positive reactance while the capacitors 47, 48, 49 are made to resonate with said positive reactance at a frequency which is lower than the operating frequency of the machine.

Figure 2:
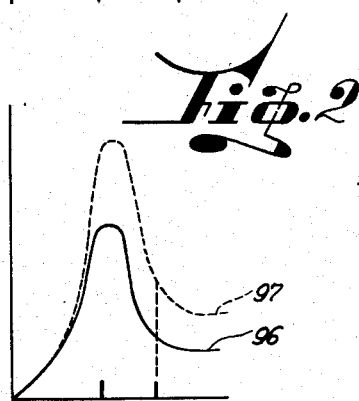
FIG. 2 shows a set of curves related to the operation of the circuit in FIG. 1.

In FIG. 2 of the accompanying drawings the frequency is plotted in the horizontal axis, while the current is plotted in the vertical axis. The no-load condition is represented by curve 96, while curve 97 is for the behaviour of the generator under normal load.

It may be seen that while the generator velocity is increasing during the starting period, the resonance frequency $F_r$ is soon reached, for which the current is at a maximum, to achieve an easy priming of the generator. Beyond this point, and particularly at the frequency $F_n$ corresponding to the nominal speed of the generator, every increase of the generator speed which would otherwise have increased the voltage, is translated by a reduction of the exciting current, which acts as a compensating measure. Thus, the terminal voltage is kept constant in spite of the velocity variations of the generator shaft.

Figure 3:
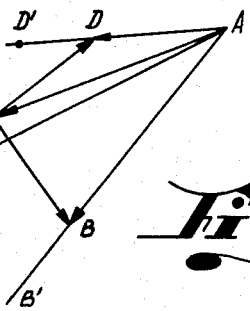
FIG. 3 shows a vector diagram related to the operation of the circuit in FIG. 1.

Now with reference to the second field winding 94 in accordance with the present invention, its operation will be disclosed in reference with the vector diagram in FIG. 3 of the drawings. In said diagram, OA is the no-load exciting current due to the voltage part of the compound exciting system. OC is the current controlled excitation with inductive load, so that in this case the total excitation is proportional to the vector AC, sum of vectors OA and OC. To this excitation is added a value CC' which is an exclusive function of the load current and is simply added to AC, without any vector consideration. This is due to the fact that AC is produced by the winding 68, while CC' is produced by the winding 94. When the generator voltage equals the bus bar voltage, the power factor is unity, as seen from the generator, and the excitation produced by current is represented by the vector OB, which added to OA, gives a resultant vector AB, to which is also added the BB' portion from the auxiliary field winding 94. With a capacitive load, i.e. when the generator voltage is lower than the bus voltage, the current controlled excitation is OD, so that its composition with AO is AD, which is less than the no-load excitation AO, and besides, would tend to diminish when the vector increases, which is just the opposite of the desired effect. But in accordance with this invention, a portion DD' is added to AD. This portion DD' may be made of any magnitude and variation law that might be necessary to compensate for the above mentioned effect.

The effect of the use of the frequency multipliers 53 and 77, may be understood by taking on account the fact that a frequency multiplier acts in part as a generator and in part as a transformer, so that not all the exciting power is obtained from the rotation of the main generator. In this way the influence of the rotating speed of the generator over the exciting current is reduced in relation with the case of a direct-current generator used as an exciting current generator. Moreover, when the main generator and frequency multiplier exciting generator are mechanically coupled, and the exciting alternating current for the frequency multiplier generator comes from the main generator, the exciting voltage for the main machine does not vary with the machine velocity, because the field rotating velocity and the rotor speed of the frequency converter vary simultaneously in the same direction, so that the rate of change of the flux linked by the armature is kept constant.

On the other hand, the ohmic resistance of the exciting winding of the exciting generator and its variation with temperature have a lower effect on the exciting current as compared with an exciting machine having direct current excitation as the impedance component originated by induction is the controlling factor in this case.

Those skilled in the art will be aware of the possibility of many variations and embodiments of the present invention.

It is possible, e.g., to use different circuit combinations for the connection of the resonance capacitors. Also a frequency multiplier having a different number of phases than the main generator may be used. There is the possibility of using a frequency multiplier driven separately from the main generator, but in this case the advantage of the elimination of the slip rings would be lost.

I claim:

1. For a polyphase alternating current generator having a shaft, an armature winding provided with output terminals, a first field winding and a second field winding, reactance means connected in series with said output terminals and each having one primary winding and two secondary windings, said secondary windings being connected in a star-zigzag connection, a first rotary polyphase frequency multiplier having a stationary field winding and a rotating armature winding having a shaft mechanically coupled with said alternating current generator shaft, capacitive means for connecting said secondary windings to said stationary field winding, and rectifier means for connecting said armature winding to said first field winding of said alternating current generator, current transformer means in series with said output terminals, said current transformer means having secondary windings connected in a star connection, a second rotary polyphase frequency multiplier having a stationary field winding and a rotating armature winding having a shaft mechanically coupled with said alternating current generator shaft, means for connecting said secondary windings of said current transformers to said stationary field winding of said second frequency multiplier, and means for connecting said armature winding of said second frequency multiplier to said second field winding of said alternating current generator.

2. For a polyphase alternating current generator having a shaft, an armature winding provided with output terminals, a first field winding and a second field winding, reactance means connected in series with said output terminals and each having one primary winding and two secondary windings, said secondary windings being connected in a star-zigzag connection, a first rotary polyphase frequency multiplier having a stationary field winding and a rotating armature winding having a shaft mechanically coupled with said alternating current generator shaft, capacitive means for connecting said secondary windings to said stationary field winding, said reactance means and said capacitive means resonating at a frequency lower than the operating frequency of said generator and rectifier means for connecting said armature winding to said first field winding of said alternating current generator, current transformer means in series with said output terminals, said current transformer means having secondary windings connected in a star connection, a second rotary polyphase frequency multiplier having a stationary field winding and a rotating armature winding having a shaft mechanically coupled with said alternating current generator shaft, means for connecting said secondary windings of said current transformers to said stationary field winding of said second frequency multiplier, and means for connecting said armature winding of said second frequency multiplier to said second field winding of said alternating current generator.

3. For a three-phase alternating current generator having a shaft, an armature winding provided with output terminals, a first field winding and a second field winding, reactance means connected in series with said output terminals and each having one primary winding and two secondary windings, said secondary windings being connected in a star-zigzag connection, a first rotary polyphase frequency multiplier having a stationary field winding and a rotating armature winding having a shaft mechanically coupled with said alternating current generator shaft, capacitive means for connecting said secondary windings to said stationary field winding, and rectifier means for connecting said armature winding to said first field winding of said alternating current generator, current transformer means in series with said output terminals, said current transformer means having secondary windings connected in a star connection, a second rotary polyphase frequency multiplier having a stationary field winding and a rotating armature winding having a shaft mechanically coupled with said alternating current generator shaft, means for connecting said secondary windings of said current transformers to said stationary field winding of said second frequency multiplier, and means for connecting said armature winding of said second frequency multiplier to said second field winding of said alternating current generator.

4. For a polyphase alternating current generator having a shaft, an armature winding provided with output terminals, a first field winding and a second field winding, reactance means connected in series with said output terminals and each having one primary winding and two secondary windings, said secondary windings being connected in a star-zigzag connection, a first rotary three-phase frequency multiplier having a stationary field winding and a rotating armature winding having a shaft mechanically coupled with said alternating current generator shaft, capacitive means for connecting said secondary windings to said stationary field winding, and rectifier means for connecting said armature winding to said first field winding of said alternating current generator, current transformer means in series with said output terminals, said current transformer means having secondary windings connected in a star connection, a second rotary polyphase frequency multiplier having a stationary field winding and a rotating armature winding having a shaft mechanically coupled with said alternating current generator shaft, means for connecting said secondary windings of said current transformers to said stationary field winding of said second frequency multiplier, and means for connecting said armature winding of said second frequency multiplier to said second field winding of said alternating current generator.

5. For a polyphase alternating current generator having a shaft, an armature winding provided with output terminals, a first field winding and a second field winding, reactance means connected in series with said output terminals and each having one primary winding and two secondary windings said secondary windings being connected in a star-zigzag connection, a first rotary polyphase frequency multiplier having a stationary field winding and a rotating armature winding having a shaft mechanically coupled with said alternating current generator shaft, means for connecting said secondary windings to said stationary field winding, and rectifier means for connecting said armature winding to said first field windings, of said alternating current generator current transformer means in series with said output terminals, said current transformer means having secondary windings connected in a star connection, a second rotary polyphase frequency multiplier having a stationary field winding and a rotating armature winding having a shaft mechanically coupled with said alternating current generator shaft, means for connecting said secondary windings of said current transformers to said stationary field winding of said second frequency multiplier, and means for connecting said armature winding of said second frequency multiplier to said second field winding of said alternating current generator.

6. For a polyphase alternating current generator an armature winding provided with output terminals a first field winding and a second field winding, reactance means connected in series with said output terminals and each having one primary winding and two secondary windings, said secondary windings being connected in a star-zigzag connection, a first rotary polyphase frequency multiplier having a stationary field winding and a rotating armature winding capacitive means for connecting said secondary windings to said stationary field winding, and rectifier means for connecting said armature winding to said first field winding of said alternating current generator, current transformer means in series with said output terminals, said current transformer means having secondary windings connected in a star connection, a second rotary polyphase frequency multiplier having a stationary field winding and a rotating armature winding means for connecting said secondary windings of said current transformers to said stationary field winding of said second frequency multiplier, and means for connecting said armature winding of said second frequency multiplier to said second field winding of said alternating current generator.

7. For polyphase alternating current generator having a shaft, an armature winding provided wtih output terminals, a first field winding and a second field winding, reactance means connected in series with said output terminals and each having one primary winding and two secondary windings, said secondary windings being connected in a star-zigzag connection a first rotary polyphase frequency multiplier having a stationary field winding and a rotating armature winding capacitive means for connecting said secondary windings to said stationary field winding, and rectifier means for connecting said armature winding to said first field winding of said alternating current generator, current transformer means in series with said output terminals, said current transformer means having secondary windings connected in a star connection, a secondary rotary polyphase frequency multiplier having a stationary field winding and a rotating armature winding having a shaft mechanically coupled with said alternating current generator shaft, means for connecting said secondary windings of said current transformers to said stationary field winding of said second frequency multiplier, and means for connecting said armature winding of said second frequency multiplier to said second field winding of said alternating current generator.

8. For a polyphase alternating current generator having a shaft, an armature winding provided with output terminals, a first field winding and a second field winding, reactance means connected in series with said output terminals and each having one primary winding and two secondary windings, said secondary windings being connected in a star-zigzag connection, a first rotary polyphase frequency multiplier having a stationary field winding and a rotating armature winding having a shaft mechanically coupled with said alternating current generator shaft, capacitive means for connecting said secondary windings to said stationary field winding, and rectifier means for connecting said armature winding to said first field winding of said alternating current generator, current transformer means in series with said output terminals, said current transformer means having secondary windings connected in a star connection, a second rotary polyphase frequency multiplier having a stationary field winding and a rotating armature winding means for connecting said secondary windings of said current transformers to said stationary field winding of said second frequency multiplier, and means for connecting said armature winding of said second frequency multiplier to said second field winding of said alternating current generator.

9. For an alternating current generator having a shaft, an armature winding provided with output terminals, a first field winding and a second field winding, reactance means connected in series with said output terminals and each having one primary winding and two secondary windings, a first rotary frequency multiplier having a stationary field winding and a rotating armature winding having a shaft mechanically coupled with said alternating current generator shaft, capacitive means for connecting said secondary windings to said stationary field winding, and rectifier means for connecting said armature winding to said first field winding of said alternating current generator, current transformer means in series with said output terminals, said current transformer means having secondary windings, a second rotary frequency multiplier having a stationary field winding and a rotating armature winding having a shaft mechanically coupled with said alternating current generator shaft, means for connecting said secondary windings of said current transformers to said stationary field winding of said second frequency multiplier, and means for connecting said armature winding of said secondary frequency multiplier to said second field winding of said alternating current generator.

10. For a polyphase alternating current generator having a shaft, an armature winding provided with output terminals, a first field winding and a second field winding, reactance means connected in series with said output terminals and each having one primary winding and two secondary windings, a first rotary polyphase frequency multiplier having a stationary field winding and a rotating armature winding having a shaft mechanically coupled with said alternating current generator shaft, capacitive means for connecting said secondary windings to said stationary field winding, and rectifier means for connecting said armature winding to said first field windings, of said alternating current generator, current transformer means in series with said output terminals, said current transformer means having secondary windings, a second rotary polyphase frequency multiplier having a stationary field winding and a rotating armature winding having a shaft mechanically coupled with said alternating current generator shaft, means for connecting said secondary windings of said current transformers to said stationary field winding of said second frequency multiplier, and means for connecting said armature winding of said second frequency multiplier to said second field winding of said alternating current generator.

References Cited in the file of this patent
UNITED STATES PATENTS

| | | |
|---|---|---|
| 2,134,880 | McDowell et al. | Nov. 1, 1938 |
| 2,363,857 | Crever et al. | Nov. 28, 1944 |
| 3,034,035 | Baumann et al. | May 8, 1962 |
| 3,074,002 | Potter | Jan. 15, 1963 |